United States Patent Office 3,226,290
Patented Dec. 28, 1965

3,226,290
MIXED FUNGICIDE PREPARATION
Gustave K. Kohn, Berkeley, Calif., assignor to Chevron Research Company, a corporation of Delaware
No Drawing. Filed June 1, 1962, Ser. No. 199,237
4 Claims. (Cl. 167—33)

This invention relates to a novel method of preparing fungicides. More particularly, this invention relates to a new method of preparing multiple component fungicides having N-acyl-N-polyhaloalkylthio and/or N-acyl-N-polyalkyldithio groups.

In many agricultural applications, it is preferred to use a number of biologically active compounds, rather than a single compound. In a few situations, the mixing is found to result in a synergistic effect. That is, the combination has a much higher activity than the simple addition of the activities of its parts. The synergism is usually derived from a combination of chemical and biological effects.

It has now been found that a synergistic effect may be obtained by the method of combining the substituents, rather than from the specific species that are combined. The enhanced activity is achieved by preparing the various components of the fungicidal mixture simultaneously in the same reaction mixture in a solvent in which the product is relatively insoluble and the components coprecipitate. This is illustrated by the following equation:

where R and R' are different acyl groups, T and T' are the same or different substituents as hereinafter described, N is nitrogen, M is a metal or hydrogen, X is halogen, S is sulfur, $n$ varies from 1 to 2, and Y is a polyhaloalkyl group. (The brackets and dot indicate that the two components are in intimate combination.) Of course, the nitrogen compound could be maintained constant and the thio compound varied as illustrated by the following equation:

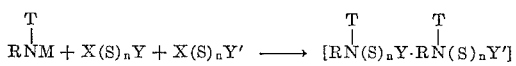

The symbols have the same meaning as indicated above, and Y' is a polyhaloalkyl group different from Y. Finally, one could use a plurality of nitrogen compounds and thio compounds, obtaining a complex crystalline product.

The physical situation in the reaction mixture is the existence of two liquid phases, the sulfenyl halide phase and the polar, usually aqueous phase, which contains the acyl substituted nitrogen compound. When more than one sulfenyl halide is used, the sulfenyl halides form a homogeneous phase which is dispersed through the polar phase. Upon reaction between the sulfenyl halide compounds and the acyl substituted nitrogen compound, the insoluble product rapidly crystallizes out as an intimate combination.

The sulfur containing precursors to the final compound which find use in this invention are polyhaloalkylsulfenyl halides and polyhaloalkylthiosulfenyl halides. The polyhaloalkyl group is a lower alkyl group, that is, of from 1 to 6 carbon atoms and, preferably, of at least 3 halogens, one of which is bonded to the carbon bonded to sulfur. The preferred compounds are those alkyl groups having up to and including 2 carbon atoms. These compounds are illustrated by the following generic formula:

where Z is hydrogen or halogen of atomic number 17 to 35, X is halogen of atomic number 17 to 35, with the proviso that at least one X is bonded to the carbon bonded to sulfur, $l=2(m-1)$, $m$ varies from 1 to 2 and $n$ varies from 1 to 2. The halogens of atomic number 17 to 35 are chlorine and bromine. The polyhalomethylsulfenyl and thiosulfenyl halides have the following formula:

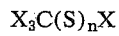

and the polyhaloethylsulfenyl and thiosulfenyl halides have the following formula:

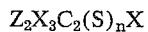

where the symbols are as defined previously.

Sulfenyl halides which are operative in this invention include such compounds as trichloromethylsulfenyl chloride, bromodichloromethylsulfenyl bromide, 1,1,2-trichloroethylsulfenyl chloride, 1,2,2 - trichloroethylsulfenyl chloride, 1,2-dibromo-1,2-dichloroethylsulfenyl chloride, 1,2-dibromo-1,2,2-trichloroethylsulfenyl chloride, perchloroethylsulfenyl chloride, 1,2,3-trichloropropylsulfenyl chloride, perchloropropylsulfenyl chloride, 1,1,2,3-tetrachloropropylsulfenyl chloride, 1,1,2-trichlorobutylsulfenyl chloride and 1,2,3,4-tetrachlorobutylsulfenyl chloride. Examples of thiosulfenyl halides which find use in this invention are trichloromethylthiosulfenyl bromide, bromodichloromethylthiosulfenyl chloride, 1,1,2,2-tetrachloroethylthiosulfenyl chloride, 1,2-dibromo-1,2-dichloroethylthiosulfenyl chloride, perchloroethylthiosulfenyl chloride and 1,2,2-trichloropropylthiosulfenyl chloride.

The nitrogen precursor is an acyl substituted amine or its metal salt, that is, an amide or imide having an acidic hydrogen or their salts. Acyl groups include carboxyl and sulfonyl groups. The acyl nitrogen compounds used in this invention have the following formula:

where R is an acyl group; T is hydrogen or an organic radical which may be alkyl, aryl, alicyclic, aralkyl, alkaryl and acyl, and when joined with R forms a ring with the nitrogen; and M is hydrogen or an alkali or alkaline earth metal cation, the particularly preferred metals being lithium, sodium and potassium.

The R and T groups should preferably be individually not more than 10 carbons, and when joined together not more than 15 carbons. Particularly preferred is R of not more than 8 carbons and R and T combined of not more than 8 carbons. R and T may be substituted by halogen, nitro, alkoxy, etc., but are preferably hydrocarbon, except for the acyl functionality.

R may be an aliphatic acid such as acetyl, butyryl, decanoyl; aromatic acids such as benzoyl, toluyl, naphthoyl; and sulfonic acids such as ethylsulfonyl, tolylsulfonyl, etc.

T may be hydrogen as when R is sulfonyl; however, it is preferred that T not be hydrogen but alkyl, such as methyl, ethyl, octyl; aryl such as phenyl, tolyl and naphthyl; alicyclic such as cyclopentyl and cyclohexyl; and acyl such as exemplified by R.

When R and T are taken together, they join to form a ring as exemplified by monocyclic imides, such as succinimide, glutarimide, suberimide, hydantoin, 5,5-dimethylhydantoin, etc., and bicyclic imides such as phthalimide, 1,2-naphthadioylimide, 4 - tetrahydrophthalimide, 1 - tetrahydrophthalimide, etc.

The preferred groups of compounds are those in which R is arylsulfonyl and T is hydrogen, alkyl or aryl and those in which R and T are taken together to form mono- and bicyclic heterocycles of up to and including 8 carbons. R and T taken together may form a hydrocarbon chain as in glutarimide or a hetero chain containing one nitrogen other than the imide nitrogen as in hydantoin.

R and T may also form a hydrocarbon chain which forms a second ring as in phthalimide.

The preferred sulfonamide salts have the formula A—M wherein M is an alkali or alkaline earth metal and A is a nitrogen-containing group of the formula:

(1) 

where $R^I$ is alkyl or aryl of not more than 8 carbons, $T^I$ is hydrogen, alkyl or aryl of not more than 8 carbons and M is as defined previously. This includes such compounds as sodio N-methyl-p-tolylsulfonamide, lithio N-p-chlorophenylbenzenesulfonamide, potassio N - octyl - 2,4-xylylsulfonamide, etc.

The preferred monocyclic imides have the formula A—M wherein M is an alkali or alkaline earth metal and A is a nitrogen-containing group of the formula:

(2) 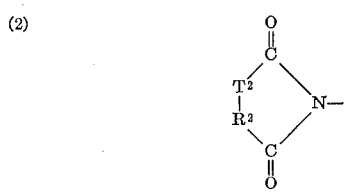

where $R^2$—$T^2$ is a hydrocarbon chain of not more than 6 carbons or a hetero chain having not more than 1 nitrogen and usually of not more than 6 carbons.

The preferred bicyclic imides have the formula A—M wherein M is an alkali or alkaline earth metal and A is a nitrogen-containing group of the formula:

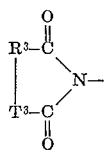

where $R^3$—$T^3$ is a monocyclic hydrocarbon group containing a ring of 5 to 6 carbons and a total of not more than 8 carbons, and M is as defined previously.

As a generic class, the individual components of the novel composition of this invention are substituted nitrogen compounds, where one of nitrogen's three valences is satisfied by a polyhaloalkylthio or -dithio group as previously described, and of the remaining two valences, at least one is satisfied by an acyl group.

The preferred compositions of this invention have the formula:

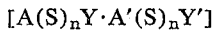

where A and A' are the same or different nitrogen-containing groups as previously defined above in Formulas 1, 2 and 3, and Y and Y' may be the same or different and are of the formula:

where Z, X, $l$, $m$ and $n$ are as defined previously. Of course, if Y and Y' are the same, then either R or R' or T or T' must be different in order that there be present two distinct compounds in the composition.

Examples of mixtures which find use in this invention are such mixtures as

N-trichloromethylthiophthalimide and
  N-pentachloroethylthiophthalimide;
N-1,2,2-trichloroethylthiohydantoin and
  N-1,1,2,2-tetrachloroethylthiohydantoin;
N-methyl-N-bromodichloromethylthiobenzenesulfonamide and N-methyl-N-1,2-dibromo-1,2-dichloroethylthiobenzenesulfonamide;
N-trichloromethylthiosuccinimide and
  N-trichloromethylthio-Δ⁴-tetrahydrophthalimide;
N-pentachloroethylthiosuccinimide and
  N-pentachloroethylthio-Δ⁴-tetrahydrophthalimide;
N-1,1,2-trichloroethylthiosulfenyl-p-nitrobenzenesulfonamide and N-1,2,2-trichloropropylthiosulfenyl-p-nitrobenzenesulfonamide;
N-trichloromethylthiosulfenyl-N,N-diacetylimide and
  N-1,2,3,4-tetrachlorobutylthiosulfenyl-N,N-diacetylimide.

While mixtures having only 2 components are preferred, mixtures having 4 components are intended to be included in this invention. Of course, any number of components could be made, but these would probably serve only specific situations.

In preparing formulations according to this invention, one or more amides or imides or their metal salts are dissolved in a solvent which is a nonsolvent for the final product. When the amides or imides are used, a strong base is added to the mixture and the mixture stirred until all the solids go into solution. One or a mixture of more than one sulfenyl or thiosulfenyl halides is then added with vigorous stirring to the previously described solution. The coprecipitated product, therefore, has at least two distinct compounds present.

The mixture will usually be cooled and vigorous agitation continued for about 2 minutes to 2 hours. The mixture is then filtered, washed with a nonsolvent and dried.

The solvent is limited by the requirement that it be a solvent for the nitrogen precursor, but a nonsolvent for the final compounds and be inert to the reactants and products. The most convenient solvent is water and is preferred. Other polar solvents which might be used are lower alkanols at relatively low temperatures, e.g., about 0° C., ethers, and mixed solvents with water, etc. By virtue of the insolubility of the product in the liquid media and vigorous agitation, tiny crystals are obtained which are sufficiently small to be used directly as fungicides, crystals of a mean size of 1 to 10μ are obtained.

The temperature of the reaction is not critical and, subject to the limitation that the solvent must remain an unreactive liquid and the product solubility is not significantly enhanced, may vary from —15° to 50° C. Preferred temperatures are in the range 0° to 20° C.

The time for the reaction is not critical, usually being in excess of 2 minutes. No advantage is found in an extended time period and agitation will usually be stopped within 2 hours.

By controlling the proportions of the reactants, the amounts of the various components may be widely varied from less than 1% to greater than 99%, depending on the characteristics desired for the resulting formulation, however, it is preferred to have at least 10% of one component.

As an illustration of the variations in specific compositions, the following examples are presented. It is to be understood that the compositions prepared in these examples are merely representative and are not to be construed as limitations on the scope of the invention.

*Example I*

To a mixture of water and ice in a Waring Blendor was added 15.1 g. (0.1 mol) tetrahydrophthalimide and 9.6 g. 50% caustic and stirred until all the organic material dissolved. A solution containing 9.3 g. perchloromethyl mercaptan ($Cl_3CSCl$) (0.05 mol) and 11.7 g. 1,1,2,2-tetrachloroethylsulfenyl chloride (0.05 mol) was slowly added to the aqueous solution with vigorous agitation. Ice was added to maintain the temperature about 0° C. The mixture was agitated for 30 minutes, filtered, washed with warm water, methanol and petroleum ether, respectively, and dried. The product weighed 21.2 g. (65% theory). The material had a melting range of 129° to 145° C.

The following is a tabular compilation of mixtures prepared according to Example I.

TABLE I

| | Nitrogen Compound | | Sulfenyl Halide | | Mol proportion | |
|---|---|---|---|---|---|---|
| | (1) | (2) | (1) | (2) | (1) | (2) |
| II | Tetrahydrophthalimide | | $CCl_3SCl$ | $HCCl_2CCl_2SCl_2$ | 50 | 50 |
| III | ----do---- | | $CCl_3SCl$ | $HCCl_2CCl_2SCl_2$ | 25 | 75 |
| IV | ----do---- | | $CCl_3SCl$ | $HCCl_2CCl_2SCl_2$ | 75 | 25 |
| V | Tetrahydrophthalimide | Phthalimide | $CCl_3SCl$ | | 50 | 50 |
| VI | ----do---- | ----do---- | $HCCl_2CCl_2SCl$ | | 50 | 50 |
| VII | Phthalimide | 5,5-dimethylhydantoin | $HCCl_2CCl_2SCl$ | | 50 | 50 |
| VIII | Tetrahydrophthalimide | ----do---- | $HCCl_2CCl_2SCl$ | | 50 | 50 |
| IX | Phthalimide | | $CCl_3SSCl$ | $HCCl_2CCl_2SSCl$ | 50 | 50 |

Mixtures prepared in the manner previously described were tested as to their activity in the control of various fungus caused plant diseases. A mechanical mix of the components was also tested.

Tomato, celery and bean plants were used. All the plants were in at least the three-leaf stage. The test plants were passed through a spray chamber and sprayed at approximately 20 p.s.i. with an aqueous suspension of a candidate fungicide at the desired dilution. After spraying, the plants were allowed to remain in an exhaust chamber until they dried. The plants were then inoculated with an aqueous suspension of the designated pathogen. The inoculated plant was then put in an incubation chamber for a sufficient period of time, usually about 18 hours, and then transferred to a holding room for a sufficient time to allow optimum development of the symptoms of the disease.

At the end of this time, the disease readings were made by counting the number of local lesions in the primary leaves of each plant. These counts were compared with a similarly inoculated but unsprayed control series to determine the percentage of fungus control effected by the fungitoxic chemical. Each test is only internally consistent and the values cannot be compared with runs carried out at different times.

The following table indicates the results obtained when comparing the compositions made according to the present invention and a mechanical mixture of the components of the composition. The $ED_{50}$ and $ED_{84}$ indicate the parts per million of the fungitoxic chemical which must be used to obtain 50 and 84% control, respectively.

Aside from the specific formulation and application of the class of compositions of the invention as represented by the foregoing tests, these compositions may be dispersed in or upon other inert liquid and solid carriers such as inert clay, xylenes, etc. The solid carriers may be in the form of a dust, or used in conjunction with a suitable wetting agent to form a wettable powder. The fungitoxic compositions of the invention may also be formulated with other solvents, dispersing agents, or emulsifying agents. Further, these compositions may not only be applied alone but may also be used in combination with other active toxicants in the formulation of fungicidal compositions.

The compositions may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment, or used in similar ways so as to effect the control of fungus and fungus-cased diseases.

The surprising improvement in properties is not understood. There was no reason to anticipate any activity increase in preparing the compounds together or preparing them separately and then combining them subsequently. That an advantage is obtained by applicant's method of preparation is evident from Table II.

As will be evident to those skilled in the art, various modifications of this process can be made or followed, in the light of the foregoing disclosure and discussions, without departing from the spirit or scope of the disclosure or from the scope of the following claims.

TABLE II

| Fungicide [1] | Mol proportions | P. infestans | | Celery Septoria | | Bean Uromyces | |
|---|---|---|---|---|---|---|---|
| | | $ED_{50}$ | $ED_{84}$ | $ED_{50}$ | $ED_{84}$ | $ED_{50}$ | $ED_{84}$ |
| AB Reaction product | 50:50 | 78 | 290 | 53 | 195 | 45 | 160 |
| Mechanical mix [2] | | 600 | | 230 | | 130 | 506 |
| AB Reaction product | 75:25 | 87 | 175 | | | | |
| Mechanical mix | | 200 | | | | | |
| AB Reaction product | 25:75 | 62 | 120 | | | | |
| Mechanical mix | | 500 | | | | | |
| AC Reaction product | 50:50 | 17 | 150 | | | | |
| Mechanical mix | | 260 | | | | | |
| BD Reaction product | 50:50 | | 10 | | | | |
| Mechanical mix | | | 200 | | | | |
| DE Reaction product | 50:50 | | 175 | | | | |
| Mechanical mix | | | >300 | | | | |
| CE Reaction product | 50:50 | 37 | 79 | | | | |
| Mechanical mix | | 200 | | | | | |

[1] A—N-1,1,2,2-tetrachloroethylthio tetrahydrophthalimide.*
B—N-trichloromethylthio tetrahydrophthalimide.*
C—3-(N-1,1,2,2-tetrachloroethylthio)-5,5-dimethylhydantoin.
D—N-trichloromethylthio phthalimide.*
E—N-1,1,2,2-tetrachloroethylthio phthalimide.

[2] The mechanical mix was prepared by mixing the desired proportions of the components in a commercial blendor for a period of about 15 to 20 minutes.

*These compounds were obtained as commercially available. The compounds were, therefore, in a physical form optimized for maximum activity when used in the mechanical mix.

I claim:
1. A method for preparing a fungitoxic product having fungitoxic activity greater than the sum total of its components,
which comprises dissolving in an aqueous medium a salt of at least one acidic nitrogen compound of the formula A—M wherein M is a member of the group consisting of alkali and alkaline earth metals and A is a member selected from the class of nitrogen-containing groups consisting of:

(1) 

wherein $R^1$ is a substituent of not more than 8 carbons and is selected from the group consisting of alkyl and aryl hydrocarbon and $T^1$ is a substituent of not more than 8 carbons and is selected from the group consisting of hydrogen, alkyl and aryl hydrocarbon;

(2) 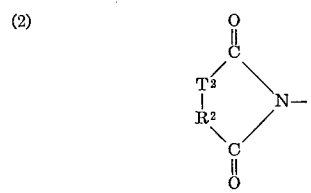

wherein $R^2$—$T^2$ is selected from the group consisting of —(CH$_2$)$_2$—, —(CH$_2$)$_3$—, —H$_2$C—NH— and —(CH$_3$)$_2$C—NH—; and (3) 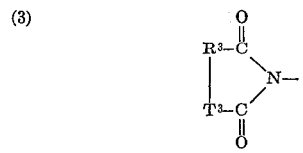

wherein $R^3$—$T^3$ is a monocyclic hydrocarbon group containing a ring of 5 to 6 carbons and a total of not more than 8 carbons;
adding to said aqueous medium at a temperature in the range of from —15° to 50° C., with vigorous agitation, at least one organic sulfur compound of the formula

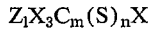

wherein Z is selected from the group consisting of hydrogen and halogen of atomic number 17 to 35, and X is halogen of atomic number 17 to 35, with the proviso that at least one X is bonded to the carbon bonded to sulfur, $l=2(m-1)$, $m$ is of from 1 to 2 and $n$ is of from 1 to 2; and with the further proviso that at least two different species of said organic sulfur compound are added when only one species of said acidic nitrogen compound salt is dissolved in said aqueous medium and at least two different species of said acidic nitrogen compound salt are dissolved in said aqueous medium when only one species of said organic sulfur compound is used in the preparation; thereby forming at least one group of the formulae

and
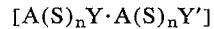

wherein A and A′ are different members selected from the class consisting of nitrogen-containing groups of Formulas 1, 2 and 3 as previously defined, $n$ is as previously defined, and Y and Y′ are different polyhaloalkyl groups of the formula $Z_lX_3C_m$ wherein Z, X, $l$ and $m$ are as previously defined.

2. Method for preparing a fungitoxic product having fungitoxic activity greater than the sum total of its components,
which comprises dissolving in an aqueous medium a salt of at least 1 acidic nitrogen compound of the formula:

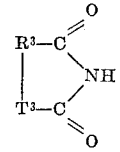

wherein $R^3$—$T^3$ is a monocyclic hydrocarbon group containing a ring of 5 to 6 carbons and a total of not more than 8 carbons;
adding at a temperature in the range of —15° to 50° C. with vigorous agitation trichloromethylsulfenyl chloride and 1,1,2,2-tetrachloroethylsulfenyl chloride, of the formula

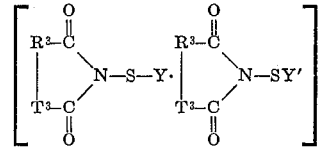

wherein Y is trichloromethyl, Y′ is 1,1,2,2-tetrachloroethyl and $R^3$—$T^3$ is as previously defined.
3. A product prepared as described in claim 1.
4. A product prepared as described in claim 2.

References Cited by the Examiner
UNITED STATES PATENTS

| | | | |
|---|---|---|---|
| 2,553,770 | 5/1951 | Kittleson | 167—33 |
| 2,553,773 | 5/1951 | Cohen | 167—38.6 |
| 2,553,775 | 5/1951 | Hawley et al. | 167—38 |

JULIAN S. LEVITT, *Primary Examiner.*

L. GOTTS, *Examiner.*